United States Patent Office 3,781,351
Patented Dec. 25, 1973

3,781,351
PREPARATION OF ALPHA-HYDROYAMIDES
Donald M. Fenton, Anaheim, Calif., assignor to Union Oil Company of California, Los Angeles, Calif.
No Drawing. Filed Oct. 27, 1971, Ser. No. 193,157
Int. Cl. C07c 103/16; C07d 103/26
U.S. Cl. 260—559 R                 15 Claims

ABSTRACT OF THE DISCLOSURE

Formamide or a substituted formamide is reacted with a carbonyl compound having from 2 to about 12 carbon atoms in a liquid reaction medium containing a ruthenium or osmium catalyst, preferably in complex association with a biphyllic ligand, at a temperature of from 50° to 300° C. to form an alpha-hydroxyamide. A typical process comprises reacting formamide with an excess of benzaldehyde in the liquid phase in the presence of ruthenium trichloride in complex association with triphenylphosphine to produce alpha-hydroxyphenyl acetamide.

The invention relates to a method forming alpha-hydroxyamides and, more particularly, the invention relates to a method of forming alpha-hydroxyamides from formamide or substituted formamides.

The alpha-hydroxyamides of this invention may be used as intermediates in preparation of other compositions. The amides may be employed as plasticizers in polymer emulsions and some, such as atrolactamide, are used as anti-convulsants in medicine. The amides are commonly prepared by reacting the alpha-hydroxyl carboxylic acid with ammoniacal water. This process, however, is burdened with the employment of the costly hydroxy acid reactant. In many preparations the hydroxy acid reactant cannot be prepared because of interfering side reactions. Thus, a need exists for a process for producing alpha-hydroxyamides from relatively inexpensive reactants and which avoids the use of hydroxy carboxylic acids.

According to my invention, alpha-hydroxyamides are prepared by reacting formamide or a substituted formamide with a carbonyl compound selected from a ketone or aldehyde in a liquid reaction medium containing a minor amount of ruthenium or osmium, preferably in complex association with a biphyllic ligand. The reaction proceeds according to the following exemplary equation:

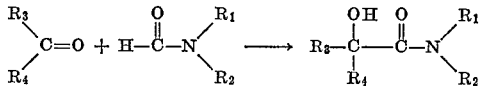

The formamide or substituted formamide reactant of this invention has the following general structure:

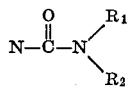

wherein $R_1$ and $R_2$ are the same or different univalent radicals selected from hydrogen or alkyl, monocyclic cycloalkyl or monocyclic aryl having from 1 to about 20 carbon atoms and preferably from 1 to about 12 carbon atoms. Preferably $R_1$ and $R_2$ are hydrogen or a $C_1$–$C_8$ alkyl.

Examples of suitable univalent radicals are methyl, ethyl, propyl, 2-ethylcyclopentyl, cyclohexyl, cyclooctyl, diethylcyclohexyl, phenyl, tolyl, benzyl, 3-phenylhexyl, 3-butyl, 4-benzyldecyl, etc.

Examples of suitable amides which may be employed in this invention include fomamide, N-methyl formamide, N,N-dimethylformamide, N-methyl-N-ethyl formamide, N-ethyl formamide, N-propyl formamide, N-butyl formamide, N-isobutyl formamide, N-hexyl formamide, N-octyl formamide, N-methyl-N-cyclohexyl formamide, N-methyl-N-decyl formamide, N-cyclobutyl formamide, N-cyclopentyl formamide, N,N-dicyclopentyl formamide, N-phenyl-N-cyclohexyl formamide, N,N-dihexyl formamide, N-cyclohexyl-N-butyl formamide, N-phenylamide, N-tolylamide, N,N-ditolylamide, N-benzyl formamide, N,N-dibenzyl formamide, N-phenylpropyl formamide, N-cyclohexyl-N-phenyl formamide, N-methyl-N-phenyl formamide, etc.

The $C_1$–$C_8$ alkyl formamides are preferred and formamide is most preferred.

The carbonyl co-reactant of this invention has from 2 to 20 carbon atoms and has the following general structure:

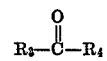

wherein $R_3$ and $R_4$ are the same or different univalent radicals selected from hydrogen or alkyl, monocyclic cycloalkyl or monocyclic aryl having from 1 to about 18 carbons and preferably from 1 to about 12 carbons. Preferably, $R_3$ and $R_4$ are alkyls having from 1 to 8 carbons.

Exemplary univalent radicals are methyl, ethyl, propyl, 2-ethylhexyl, octyl, nonyl, decyl, octadecyl, cyclobutyl, methylcyclopentyl, cyclohexyl, cyclooctyl, diethylcyclohexy, phenyl, tolyl, benzyl, 3-phenylhexyl, 3-butyl 4-benzyldecyl, etc.

Exemplary carbonyl compounds include formaldehyde, acetaldehyde, propanal, butanal, pentanal, 2-methyl pentanal, cyclohexanal, benzaldehyde, dimethyl ketone, methyl ethyl ketone, methyl propyl ketone, diethyl ketone, methyl cyclopentyl ketone, methyl cyclohexyl ketone, methyl phenyl ketone, diphenyl ketone, cyclopentyl phenyl ketone, methyl p-methylphenyl ketone, ethyl phenyl ketone, etc.

The catalyst of this invention may be ruthenium or osmium or a compound thereof soluble in the reaction medium and preferably ruthenium. A minor amount of the catalyst is used, e.g., 0.001–5 weight percent, preferably 0.01–2 weight percent, preferably 0.01–1 percent calculated as the metal and based on the reaction medium. The metal may be added as a compound soluble within the reaction medium such as a salt or complex, preferably a salt such as a halide (chloride, bromide, iodide, or fluoride), hydroxide, cyanide, nitrate, sulfate, carbonate, $C_1$–$C_5$ carboxylate, etc. The metal may also be added as a free metal providing the reaction medium includes a complexing agent or anion, such as the aforementioned anions, carbon monoxide, a halogen, hydrogen, or a biphyllic ligand as will be described hereinafter. Preferably, the catalyst is added as a halide; preferably chloride. Suitable sources of the metal catalyst include ruthenium tetrachloride, ruthenium trichloride, ruthenium cyanide, ruthenium pentacarbonyl, ruthenium carbonyl hydride, ruthenium nitrate, ruthenium hydroxide, ruthenium sulfide, tetraaminorutheniumhydroxychloro chloride, ruthenium acetate, ruthenium benzoate, osmium dichloride, osmium iodide, osmium oxide, osmium nitrate, osmium sulfite, chloroosmic acid, osmium valerate, osmium sulfate, tetraaminoosmiumhydroxy chloride, ruthenium bromide, etc. The particular method by which the metal is added to the reaction medium is not the essence of the invention nor particularly critical to the reaction.

The process is preferably conducted in the presence of a biphyllic ligand which forms a complex with and stabilizes the aforementioned catalyst. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about 3 carbons and containing arsenic or phosphorus in a trivalent state. Of these, the phosphorus compounds, i.e., the phosphines, are preferred; however, arsines can also be employed. In general these biphyllic ligands have the following structure:

$$E(R)_3$$

wherein E is trivalent phosphorus or arsenic; and
wherein R is the same or different alkyl having 1 to about 10 carbons, cycloalkyl having 4 to about 10 carbons and/or aryl having 6 to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc., and, most preferably, the ligand is triaryl.

Examples of suitable biphyllic ligands having the aforementioned structure and useful in my invention to stabilize the catalyst composition are the following:

trimethylphosphine,
triethylarsine,
triisopropylphosphine,
dioctylcycloheptylphosphine,
tricyclohexylphosphine,
ethyldiisopropylarsine,
tricyclohexylphosphine,
methyldiphenylphosphine,
methyldiphenylarsine,
triphenylphosphine,
triphenylarsine,
tri(o-tolyl)phosphine,
ethyldiphenylphosphine,
phenylditolylphosphine,
phenyldiisopropylphosphine,
phenyldiamylphosphine,
xylyldiphenylarsine,
tolyl-di(m-xylyl)arsine,
trixylylphosphine,
trixylylarsine,
cyclopentyldixylylphosphine,
dioctylphenylphosphine,
tridurylphosphine,
tricumenylphosphine, etc.

Of the aforementioned, the mono-, di- and tri-aryl phosphines, particularly the triarylphosphines (e.g., triphenylphosphine), are preferred because of their greater activity.

The catalyst may be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300% of that stoichiometrically required to form a complex with the metal and is generally 0.01–10 weight percent of the reaction medium. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc. may be, but need not be, included in the complex catalyst of this invention. These components may be incorporated in the catalyst by the formation of the catalyst complex from a metal salt of the indicated anions.

The process is preferably conducted in the presence of 0.01–10 weight percent, preferably 0.01–5 percent of a base, preferably a strong base such as the alkali or alkaline earth metal hydroxides, e.g., sodium hydroxide, potassium hydroxide, lithium hydroxide, calcium hydroxide, magnesium hydroxide, etc. Since the reactant amide is alkaline, the addition of further alkaline agents is not essential to operability but is only preferred for maximum activity.

The reaction is performed under liquid phase conditions. When the reactants and/or product are liquid under the reaction conditions, they can form the desired liquid phase and be diluted, if desired, with a suitable inert organic liquid, preferably a liquid which is a solvent for the reactants and catalyst. Suitable liquids include the saturated aliphatic, saturated alicyclic and aromatic hydrocarbons which are exemplified by hexane, heptane, octane, benzene, toluene, cyclohexane, cyclodecane, etc. The liquid phase can also be formed simply by use of an excess of the reactant amide or carbonyl compound, if a liquid, e.g., 2–100 times that stoichiometrically required for the reaction.

The process may be conducted at mild conditions such as temperatures of 50°–300° C., preferably 100°–250° C., and pressures of 1–70 atmospheres absolute, preferably 1–30 atmospheres and sufficient to maintain liquid phase conditions. The desired pressure may be maintained by adding an inert gas, e.g., nitrogen, to the reaction mixture; however, addition of an inert gas is generally not required.

The reaction can be performed batchwise or in a continuous fashion. When operating batchwise, the catalyst, reaction medium, the amide, the carbonyl compound and the strong base, if utilized, can be introduced in the reaction zone to form a liquid phase therein. The reaction zone can be heated to a desired reaction temperature by preheating the liquid so introduced or by use of heating means in the reactor. In the case where an inert gas is utilized, the inert gas can be introduced to maintain the desired reaction pressure. When performing the reaction in a continuous fashion, the liquid components can be continuously charged to the reaction zone to maintain a liquid phase therein and the amide reactant can be continuously introduced into the reaction zone to contact the reaction medium containing the catalyst.

The alpha-hydroxyamide products of the invention may be recovered from the reaction medium by crystallization or by distillation. Generally, the amide products have high boiling points and usually higher than the reaction medium, and hence crystallization is a preferred recovery mode. The hydroxyamides are not stable at elevated temperatures and if distillation techniques are employed to recover the product, sub-atmospheric distillation conditions are preferably employed.

The invention is further illustrated by the following examples which are illustrative of specific modes of practicing the invention and are not intended as limiting the scope of the invention as defined by the appended claims.

EXAMPLE 1

The following example illustrates the invention and demonstrates the results actually obtained.

To a 500 milliliter flask were added 75 milliliters of octylaldehyde, 75 milliliters of formamide, ½ gram of ruthenium trichloride and 3 grams of triphenylphosphine. The flask was equipped with a Dean-Stark tube and heat was supplied the flask to reflux the contents for approximately 6 hours. The flask was cooled and a white solid was precipitated from the solution. The white solid was analyzed and found to be alpha-hydroxynonanamide.

EXAMPLE 2

To a 500 milliliter flask were added 100 milliliters of benzaldehyde, 75 millilters of formamide, ½ gram of ruthenium trichloride and 3 grams of triphenylphosphine. The flask was equipped with a Dean-Stark tube and heat was supplied to the flask to bring the contents to reflux. The contents were heated at reflux for 2 hours at which time a white solid sublimed from the solution. It was found 23 grams of solid in the flask and the filtrate was distilled to give 36 grams total of a white solid. The solid was chemically analyzed to be alpha-hydroxyphenyl acetamide.

EXAMPLE 3

To a 500 milliliter flask equipped with a Dean-Stark trap was added 100 milliliters of 2-octanone, 75 milliliters of formamide, ½ gram of ruthenium trichloride and 3 grams of triphenylphosphine. The flask was heated to bring the contents to reflux for 24 hours. A white solid precipitate from the flask and the filtrate was distilled to give 21 grams of a solid. The solid was chemically analyzed to be alpha-methylnonenamide.

EXAMPLE 4

The following examples illustrate other modes of practice contemplated:

To a one liter bomb may be charged 200 milliliters of N,N-diethylformamide, 200 milliliters of acetone, 2 grams of osmium nitrate and 20 grams of triphenylarsine. The bomb is pressured to 100 p.s.i.g. with nitrogen and then rocked and heated to 175° C. for 10 hours. The liquid contents are removed and N,N-diethyl-alpha-hydroxyisobutyramide is recovered by distillation.

A one liter bomb is charged with 200 milliliters of formamide, 400 milliliters of acetone, 2 grams of ruthenium trichloride and 20 grams of triphenylphosphine. The bomb is pressured to 150 p.s.i.g. with nitrogen and then rocked and heated to 175° C. for 10 hours. The bomb is then cooled and the liquid contents separated by vacuum distillation. Alpha-hydroxyisobutyramide is recovered.

A one liter bomb is charged with 200 milliliters of formamide, 400 milliliters of acetaldehyde, 2 grams of ruthenium trichloride and 20 grams of triphenylphosphine. The bomb is pressured to 150 p.s.i.g. with nitrogen and then rocked and heated to 175° C. for 10 hours. The bomb is then cooled and the liquid contents separated by vacuum distillation. Alpha-hydroxylactamide is recovered.

I claim:

1. A process for the production of an alpha-hydroxyamide which comprises contacting an amide having the formula:

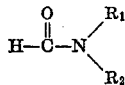

wherein $R_1$ and $R_2$ are the same or different univalent radicals selected from hydrogen or alkyl having from 1 to about 20 carbons, phenyl, tolyl or benzyl;

with a carbonyl compound having from 2 to about 70 carbons and having the formula:

wherein $R_1$ and $R_2$ are the same or different univalent radicals selected from hydrogen or alkyl having from 1 to about 18 carbons, phenyl, tolyl or benzyl;

in a liquid reaction medium containing from 0.001 to 5 weight percent of a catalyst of ruthenium or osmium metal, ruthenium or osmium halide, hydroxide, cyanide, nitrate, sulfate, carbonate, $C_1$–$C_5$ alkanoate or a complex thereof with carbon monoxide, hydrogen or a biphyllic ligand of $$E(R)_3$$

wherein E is a trivalent phosphorus or arsenic and R is the same or different alkyl having from 1 to about 10 carbons, monocyclic cycloalkyl having 4 to about 10 carbons or phenyl or alkyl phenyl having up to about 10 carbons at a temperature of from 50° to 300° C. and a pressure sufficient to maintain liquid phase conditions.

2. The process of claim 1 wherein said catalyst is a complex with said biphyllic ligand.

3. The process of claim 2 wherein said catalyst is the complex of ruthenium with said biphyllic ligand.

4. The process of claim 3 wherein said biphyllic ligand is an aryl phosphine.

5. The process of claim 1 wherein said amide is formamide.

6. The process of claim 5 wherein the catalyst is formed by adding ruthenium trichloride and a triarylphosphine to the reaction medium.

7. A process for the production of alpha-hydroxy-isobutyramide which comprises contacting formamide with acetone in a liquid reaction medium containing from 0.001 to 5 weight percent of a catalyst of ruthenium or osmium metal, ruthenium or osmium halide, hydroxide, cyanide, nitrate, sulfate, carbonate, $C_1$–$C_5$ alkanoate or a complex thereof with carbon monoxide, hydrogen or a biphyllic ligand of $$E(R)_3$$

wherein E is a trivalent phosphorus or arsenic and R is the same or different alkyl having from 1 to about 10 carbons, monocyclic cycloalkyl having 4 to about 10 carbons or phenyl or alkyl phenyl having up to about 10 carbons at a temperature of from 50° to 300° C. and a pressure sufficient to maintain liquid phase conditions.

8. A process for the production of alpha-hydroxylactamide which comprises contacting formamide with acetaldehyde in a liquid reaction medium containing from 0.001 to 5 weight percent of a catalyst of ruthenium or osmium metal, ruthernium or osmium halide, hydroxide, cyanide, nitrate, sulfate, carbonate, $C_1$–$C_5$ alkanoate or a complex thereof with carbon monoxide, hydrogen or a biphyllic ligand of $$E(R)_3$$

wherein E is a trivalent phosphorus or arsenic and R is the same or different alkyl having from 1 to about 10 carbons, monocyclic cycloalkyl having 4 to about 10 carbons or phenyl or alkyl phenyl having up to about 10 carbons at a temperature of from 50° to 300° C. and a pressure sufficient to maintain liquid phase conditions.

9. The process of claim 7 wherein said catalyst is a complex with said biphyllic ligand.

10. The process of claim 9 wherein said biphyllic ligand is triphenylphosphine.

11. The process of claim 8 wherein said catalyst is a complex with said biphyllic ligand.

12. The process of claim 11 wherein said biphyllic ligand is triphenylphosphine.

13. The process of claim 12 wherein said reaction medium also contains from 0.01 to 10 weight percent of an alkali or alkaline earth metal hydroxide.

14. The process of claim 1 wherein said reaction medium also contains from 0.01 to 5 weight percent of an alkali or alkaline earth metal hydroxide.

15. The process of claim 10 wherein said reaction medium also contains from 0.01 to 5 weight percent of an alkali or alkaline earth metal hydroxide.

References Cited
UNITED STATES PATENTS 3,230,228    1/1966    Erlemann et al. _____ 260—561

HARRY I. MOATZ, Primary Examiner

U.S. Cl. X.R.

260—557 R, 561 R, 562 R

UNITED STATES PATENT OFFICE
CERTIFICATE OF CORRECTION

Patent No. 3,781,351          Dated December 25, 1973

Inventor(s) Donald M. Fenton

It is certified that error appears in the above-identified patent and that said Letters Patent are hereby corrected as shown below:

In the Title, column 1:

"PREPARATION OF ALPHA-HYDROYAMIDES" should be

-- PREPARATION OF ALPHA-HYDROXYAMIDES --.

Signed and sealed this 16th day of July 1974.

(SEAL)
Attest:

McCOY M. GIBSON, JR.  
Attesting Officer

C. MARSHALL DANN  
Commissioner of Patents